United States Patent [19]

Marcantonio

[11] Patent Number: 4,915,928
[45] Date of Patent: Apr. 10, 1990

[54] PROCESS FOR REMOVING SELENIUM FROM WASTEWATER EFFLUENT

[75] Inventor: Paul J. Marcantonio, San Rafael, Calif.

[73] Assignee: Chevron Research Company, San Francisco, Calif.

[21] Appl. No.: 331,360

[22] Filed: Mar. 31, 1989

[51] Int. Cl.⁴ .................... B01D 15/04; B01D 15/06
[52] U.S. Cl. ................................ 423/510; 210/670; 210/673; 210/683; 210/758; 423/DIG. 14
[58] Field of Search ............... 423/510, 509, DIG. 14; 210/673, 670, 683, 758

[56] References Cited

U.S. PATENT DOCUMENTS 2,911,363 11/1959 Kissling .......................... 210/673
3,966,889 6/1976 Kakuta et al. .................. 423/510
3,992,511 11/1976 Waehner et al. ............... 423/510
4,518,760 5/1985 Smith et al. ..................... 528/68

*Primary Examiner*—Jeffrey E. Russel
*Assistant Examiner*—Stephen G. Kalinchak
*Attorney, Agent, or Firm*—Burns, Doane, Swecker & Mathis

[57] ABSTRACT

Disclosed is a process for removing selenium from wastewater effluent. The processd includes the steps of;
(i) contacting a selenide containing wastewater and a strong-base anion exchange resin to absorb selenide on the resin;
(ii) eluting the ion exchange resin with an eluant which is effective for stripping selenide therefrom; and
(iii) recovering elemental selenium from the selenide containing eluate resulting from step (ii). Also disclosed is a process for regenerating the ion exchange resin by treatment of the resin with an acidic chlorate solution.

33 Claims, 3 Drawing Sheets

PROCESS FOR REMOVING SELENIUM FROM WASTEWATER EFFLUENT

BACKGROUND OF THE INVENTION

The present invention relates to a process for removing selenium from waste water effluent, and more particularly, to a process for removing selenium from petroleum refining wastewater. The present invention also relates to a process for regenerating a fouled ion exchange resin used to treat selenium containing wastewater. Furthermore, the present invention relates to a process for recovering elemental selenium from selenide containing aqueous feed stream.

Selenium is a naturally occurring element that can occur in several oxidation states. It can exist in the [−II] (selenide), [O] (elemental selenium), [+IV] (selenite), and [+VI] (selenate) oxidation states, with only the latter two occurring in inorganic natural water systems. Selenium is a ubiquitous element having an average concentration of about 0.7 ppm in the earth's crust, and is concentrated in such diverse things as plants, sulfur deposits, sulfide minerals of copper and molybdenum, and fossil fuels. As a result, selenium can be found in waste streams from copper refining, acid coal mine drainage, coal-fired power plants, and petroleum refining.

Selenium has also been found in waste agricultural irrigation water. In this regard, the presence of selenium in waste agriculture and irrigation water recently has become a major pollution concern. Selenium poisoning has been implicated in waterfowl deaths and deformities at the Kesterson National Wildlife, Refuge near Los Banos, Calif. The potential of selenium poisoning, therefore, has generated significant interest in a number of different industries where research activity has been directed to the removal of selenium from wastewater.

Because the selenium concentration in waste streams is generally small, i.e., usually in the ppb range, wastewater treatment techniques have been of the adsorption type such as ion exchange, iron and aluminum hydroxide adsorption, and activated carbon adsorption. Also, lime precipitation and reverse osmosis techniques have been attempted.

Lime precipitation, however, has not achieved adequate technical success, while reverse osmosis has been found to be very costly. The success of the various adsorption methods depends largely on the selenium species present and on competitive ions in solution. As noted above, selenium can exist as selinide, elemental selenium, selenite, and selenate, with only selenite (Se[IV]) and selenate (Se[VI]) occurring in inorganic natural water systems. Of these species, ion exchange favors selenate over selenite, whereas the opposite is true for iron hydroxide adsorption. Since most natural waters include a mixture of the two selenium species, it has been difficult to approach complete removal using only one step. Furthermore, oxidation to, or reduction from, the selenate state is kinetically very slow which further inhibits optimization. Ion exchange also has not been a successful removal technique because selenate shows almost identical resin affinity as sulfate, which is usually present in a concentration of several orders of magnitude higher than selenate. Thus, the sulfate simply out competes selenium for resin sites. Furthermore, ion exchange resins become fouled when used to treat selenium wastewater and methods for regeneration are often inadequate and unpredictable.

OBJECTS AND SUMMARY OF THE INVENTION

Accordingly, it is a general object of the invention to provide a novel ion exchange process for removing selenium from wastewater effluent.

It is another object of the invention to provide a novel process for regenerating a fouled ion exchange resin used to remove selenium from wastewater effluent.

It is even another object of the invention to provide an effective method for recovering elemental selenium from a selenide containing ion exchange eluate.

As noted above, petroleum refining is an industry wherein selenium containing wastewater is often produced. In particular, selenium is often found in "sour water" produced from refining processing. Therefore, it is even a further object of the invention to provide a novel ion-exchange process to remove selenium from sour water produced by petroleum refining. In this regard, it is another object of the invention to provide a process for regenerating a fouled ion exchange resin used to treat selenium containing sour water from refining processing.

Generally, therefore, the invention provides a process for removing selenium from wastewater effluent comprising the steps of;

(i) contacting a selenide containing wastewater with a strong-base anion exchange resin to adsorb selenide on the resin;

(ii) eluting the ion exchange resin with an eluant which is effective for stripping selenide therefrom; and (iii) recovering elemental selenium from the selenide containing eluate resulting from step (ii).

When the ion exchange resin becomes fouled, the invention provides a technique for regenerating the ion exchange resin by treatment of the resin with an acidic chlorate solution. Also, the invention provides a novel and unexpectedly effective method for recovering elemental selenium from a selenide containing feed stream wherein the selenide containing feed is subjected to acidification and/or oxygenation to precipitate elemental selenium.

In a petroleum refining context, sulfur is stripped from selenide containing sour water and the stripped sour water is subjected to ion exchange treatment with a strong-based anion exchange resin to adsorb selenide. Selenide is then eluted from the loaded ion exchange resin with an eluant containing at least one of (a) sodium chloride and (b) sodium hydroxide. Elemental selenium is recovered from the selenide containing eluate using at least one of (a) acidification of the eluate and (b) oxygenation of the eluate.

DETAILED DESCRIPTION OF THE PREFERRED EMBODIMENTS

Figure 1:
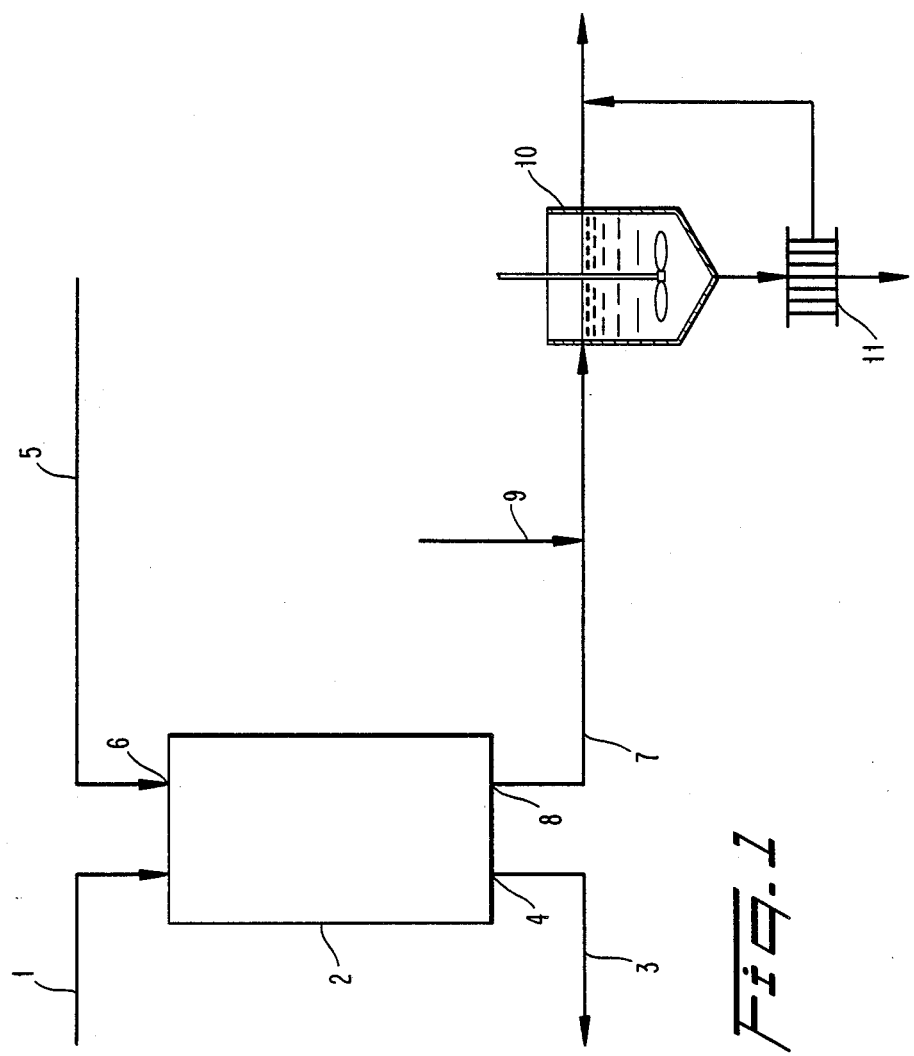
FIG. 1 is a schematic diagram of a process for removing selenium from stripped sour water.

As noted above, the present invention is directed to the removal of selenium from wastewater effluent by ion exchange. In a preferred embodiment, selenium is removed from the stripped sour water effluent from petroleum refining processing. The process of the present invention is particularly effective in the context of the preferred embodiment because the various petroleum refining operations leave selenium in the form of metastable selenide (Se[−II]). Compared to other forms of selenium which may be found in aqueous environments (i.e., elemental selenium [O], selenite [+IV], and selenate [+VI], selenide has unexpectedly been found to exhibit a strong affinity to strong-base anion exchange resins. Typically, when a stripped sour water effluent is treated, the competition for resin sites is from sulfide, chloride and organic acids, none of which seriously inhibit selenium uptake.

In aqueous systems, selenide is unstable except when the pH of the system is greater than 12, or there is a presence of $S^{-2}$, $CN^{-}$, or $SO_3^{-2}$. In refinery processes in which hydrogen sulfide is absorbed into an aqueous stream (i.e., "sour water"), selenide follows the sulfur throughout processing. However, once sulfur is stripped from the sour water, the remaining selenide may then be removed by ion exchange. Selenide may be removed because competition from high sulfide concentration no longer exists.

Ion exchange is an adsorption operation in which there is a reversible chemical reaction between a solid and a fluid when the fluid is passed through a bed of the solid. During the operation, certain ions from the fluid are exchanged with ions from the solid. Since the solid has only a limited number of exchange sites the solid is treated with a suitable eluant to remove the exchanged ions once they are loaded onto the resin.

In the present invention, the selenide containing waste water is passed through a bed of strong-base anion exchange resin. Generally, the adsorption mechanism is as follows:

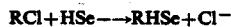

The ion exchange resin which may be used in the present invention is a strong-base quaternary ammonium anion exchange resin. Particularly preferred strong base quaternary ammonium anion exchange resins, are those with divinylbenzene crosslinking. Typically, suitable strong-base anion exchange resins are available commercially. For example, two such strong-base anion exchange resins are marketed under the trademark "Amberlite IRA-458" by Rohm and Haas and "Dowex 11" by Dow Chemical.

The selenide containing wastewater may be contacted with the strong-base ion exchange resin at a rate of about 1 to about 8 gpm/ft$^3$ of bed volume, preferably about 3 to about 6 gpm/ft$^3$, and most preferably, about 4 to about 5 gpm/ft$^3$. Of course, the actual rate will be a function of the conditions of a particular process. Usually a bed depth of at least about 30 inches is desirable, the temperature normally will be under about 50° C. and the exchange capacity should be in the range of about 1.0 to about 1.4 milliequivalents/ml.

As noted above, the process of the present invention is particularly useful for removing selenium from stripped sour water from petroleum refining. By using ion exchange to remove selenide from stripped sour water, it has been found that the amount of selenium can be reduced by at least about 50%, in some cases by at least about 80%, and even as much as 95%, or more, based on the initial selenium content of the feed stream. In this regard, normally the initial selenium content of the water treated by the process of the present invention will be less than about 10 ppb.

Generally, the loaded ion exchange resin may be eluted with any eluant which is effective for stripping selenide from the loaded resin. However, for the preferred embodiment of the present invention wherein selenide is removed from stripped sour water it has been found that a sodium chloride or sodium hydroxide containing eluant is effective. Quite surprisingly excellent results can be obtained using an eluant containing both sodium chloride and sodium hydroxide. In particular, excellent results can be obtained using an eluant containing from about 1 to about 10, and more preferably from about 3 to about 5% sodium chloride, and from about 0.1 to about 2, and more preferably from about 0.3 to about 0.7% sodium hydroxide.

The eluant is particularly effective if heated. Preferably the eluant is heated to a temperature ranging from about 30 to about 50, and more preferably from about 45° to about 50° C.

It has been discovered with respect to the elution operation that selenium diffusion is rate controlling. Therefore, it is desirable that the flow rate of the eluant be as low as practically possible. Preferably, elution is carried out at a rate of from about 0.1 to about 0.8, and more preferably from 0.2 to about 0.3 gpm/ft$^3$.

According to the invention, once the selenium is eluted from the ion exchange resin, it is recovered from the eluate. This aspect of the invention has been found to be unexpectedly effective. It was discovered that metastable selenide (or its protected form, biselenide, HSe-) was not only the species of selenium loaded on the ion exchange resin, but also the species eluted from the resin. Unstable selenide is a strong enough reductant to break water and evolve hydrogen. Therefore, it has a natural tendency to dissociated into elemental selenium and precipitate out, particularly since the selenide is in a high concentration in the eluate relative to the untreated selenide containing feed.

The natural tendency of selenide to dissociate and precipitate as elemental selenium can be further enhanced by acidification and/or oxygenation of the eluate. Particularly preferred is the combined acidification and oxygenation of the eluate. Therefore, elemental selenium can be recovered by natural precipitation, preferably with the aid of either acidification or oxygenation, and most preferably with the aid of either acidification or oxygenation, and most preferably with the aid of both acidification and oxygenation. The mechanisms for these four techniques are as follow:

| Type | Mechanism | G° (Kcal/mole) |
|---|---|---|
| natural | $HSe^- + H_2O \rightarrow Se° + H_2 + OH^-$ | −4.5 |
| acidification | $HSe^- + H^+ \rightarrow Se° + H_2$ | −23.6 |
| oxygenation | $HSe^- + \frac{1}{2}O_2 \rightarrow Se° + OH^-$ | −61.2 |
| acidification & oxygenation | $HSe^- + \frac{1}{2}O_2 + H^+ \rightarrow Se° + H_2O$ | −80.3 |

Generally, acidification can be accomplished by any means effective for that purpose. For example, the eluate can be acidified by adding an acid such as HCl, $H_2SO_4$, $HNO_3$, $H_3PO_4$, $HClO_4$. The resulting pH of the eluate should range from about 1 to about 7, preferably about 2 to about 6, and most preferably about 3 to about 5.

Oxygenation can likewise be carried out according to any method effective for that purpose. Examples of such methods include air sparging, dissolved air injection, agitation, and induced air flotation.

The precipitated elemental selenium can then be recovered from the eluate in a number of ways. For example, the precipitate can be recovered using a flotation cell, thickening, or filtering. It has been found that using acidification and filtering work well and keep the process simple without added equipment.

Following recovery of the elemental selenium the eluate may, if desired, be recycled back to the eluant. Thus, the elution operation of the process can be substantially closed looped, requiring only a small bleed steam if necessary to maintain a desired salt level.

In terms of the preferred embodiment of removing selenium from stripped sour water, the invention is illustrated by FIG. 1. A stripped sour water feed containing selenide (1) is passed into ion exchange column (2) containing a strong-base anion exchange resin where selenide is adsorbed onto the resin. Treated effluent (3), containing a reduced amount of selenide, exits the ion exchange column (2) at (4). Eluant (5), containing at least one of sodium chloride and sodium hydroxide, is fed to ion exchange column (2) at (6), where it contacts the selenide loaded resin. Selenide containing eluate (7) exits ion exchange column (2) at (8). The eluate (7) is then acidified at (9) and oxygenated, for example, in a conical bottom tank (10). Elemental selenium is precipitated and recovered from the conical bottom tank (10), and dewatered by filterpress (11).

Even with regular elution, the anion exchange resin will eventually become fouled. When stripped water from petroleum refining is treated, resin fouling can be a major problem. Generally, a resin used to treat stripped sour water can be regenerated about every 10 to about 20 elution cycles. Of course, the frequency of regeneration will vary depending on the amount of fouling of a particular resin and the characteristics of the particular waste stream to be treated.

Typical foulants can include organic acids, elemental sulfur, polysulfides and elemental selenium. Ammonium polysulfide ("APS"), a very difficult component to strip from the resin, is added to many refinery streams as a corrosion inhibitor, reacting with cyanide to form non-toxic and noncorrosive thiocyanate. The amount of APS added to water is usually only about 10 ppm, but is more than an order of magnitude higher than the selenium concentration with a much greater affinity for the resin.

Some metastable selenide from the stripped sour water effluent may disassociate to elemental selenium during ion exchange treatment, thus producing elemental selenium as a resin foulant. To obtain a thorough regeneration of the resin, therefore, it is necessary to use an oxidizing agent to convert the elemental selenium to selenite ($SeO_3^{-2}$) or selenate ($SeO_4^{-2}$) which can then be washed from the resin.

After intensive investigation and trials with many oxidizing agents which did not provide sufficiently effective results, it was unexpectedly discovered that an acidic chlorate solution was particularly effective as a regenerant. Quite surprisingly, it was also found that a resin regenerated with an acid chlorate solution could perform at least as well as an unused resin and out perform a fresh resin at times. That is, in some cases it was found that resin regenerated according to the present invention could load at least as much selenium, if not more, than a fresh resin.

Assuming that selenious acid is the resulting product, the half-cell redox reactions and the overall reaction of regeneration are:

|  |  | E°, (volts) |
|---|---|---|
| $2\{ClO_3^- + 6H^+ + 6e^- =$ | $Cl^- + 3H_2O\}$ | 1.45 |
| $3\{Se + 3H_2O =$ | $H_2SeO_3 + 4H^+ + 4e^-\}$ | −0.74 |
| $3Se + 2ClO_3^- + 3H_2O =$ | $3H_2SeO_3 + 2Cl^-$ | +0.71 (−196 Kcal/mole) |

Thus, both the positive redox potential and the negative free energy of the reaction indicate that the regeneration reaction is highly favorable.

A suitable chlorate solution contains from about 1 to about 15% sodium chlorate and from about 0.5 to about 10% hydrochloric acid. Preferably, the acidic chlorate solution contains from about 1 to about 8% sodium chlorate and from about 0.5 to about 5% hydrochloric acid, and most preferably from about 2 to about 4% sodium chlorate and from about 0.5 to about 2% hydrochloric acid.

To further enhance regeneration it is desirable to use an acidic chlorate solution having a temperature ranging from about 35° to about 60° C., preferably from about 40° to about 55° C., and most preferably from about 45° to about 50° C. In this regard, the regeneration reaction was surprisingly found to be very temperature sensitive. The induction period, i.e., the period required for the first indication of selenium removal, varied significantly with temperature change and is very pronounced at lower temperatures. It has also been found that running the regenerant upflow in a steady flow or in periodic pulses may be necessary to release trapped bubbles of chlorine that form in the resin bed during regeneration.

Although not particularly critical and generally based on overall process conditions, the acidic chlorate solution should be passed over the resin at a rate of about 0.05 to about 0.8, preferably 0.1 to about 0.5, and most preferably from about 0.2 to about 0.3 gpm/ft$^3$.

To obtain a more complete understanding of the present invention, the following Examples illustrating certain aspects of the invention are set forth. It should be understood, however, that the invention is not limited in any way to the specific details set forth therein.

EXAMPLE 1

To demonstrate the effectiveness of using ion exchange for removing selenium from wastewater effluent, stripped sour water was passed through a bed of Dowex 11, a quaternary ammonium anion exchange resin having divinylbenzene crosslinking. More particularly, a feed of stripped sour water containing selenium ranging in amounts of from about 244 to 393 ppb was continuously passed through a 1 ft$^3$ resin bed at a rate of 5 gpm/ft$^3$. The goal was to reduce the average selenium concentration of the feed to about 26 ppb or less.

Figure 2:
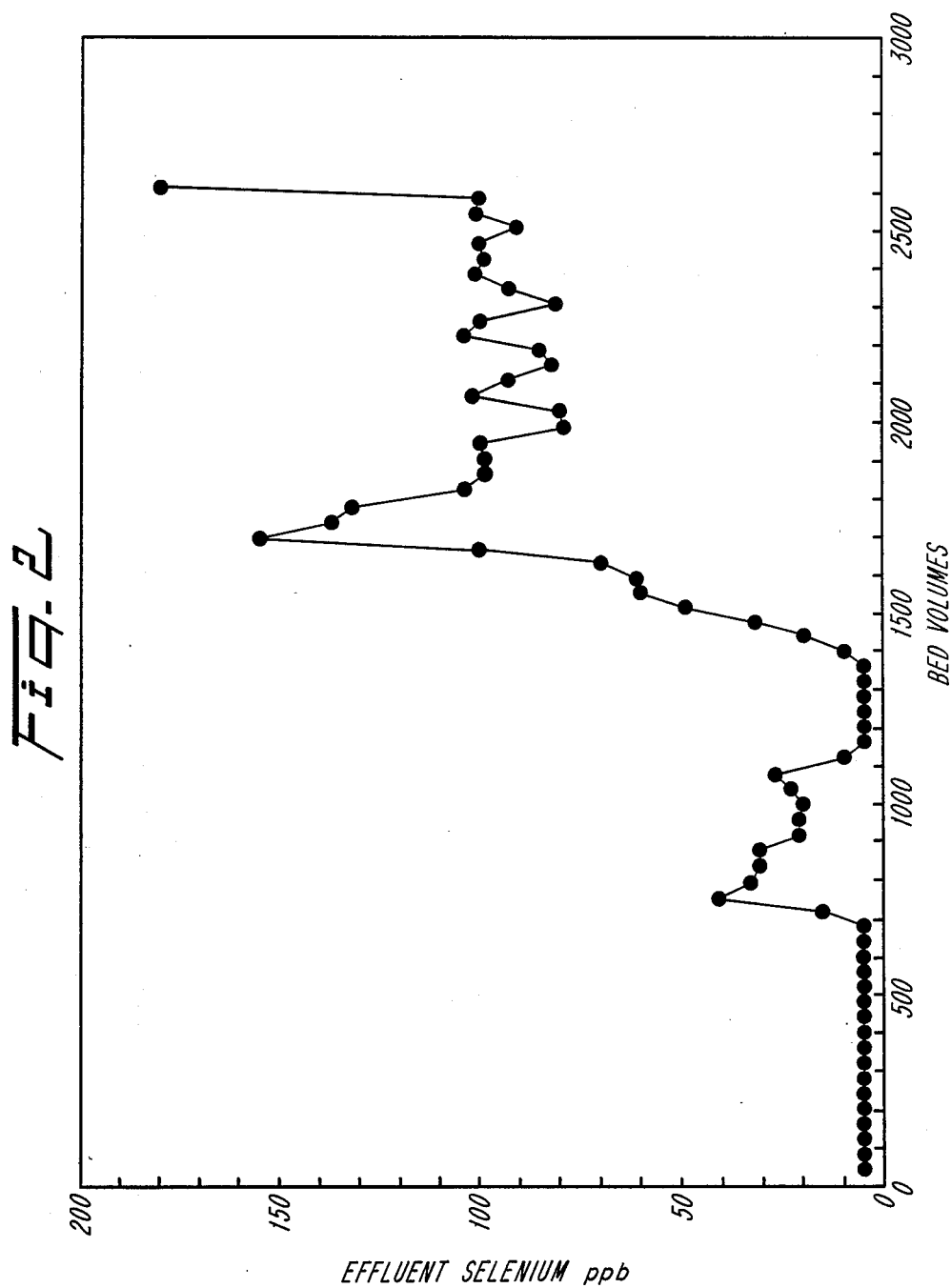
FIG. 2 is a graph illustrating the results of Example 1.

The results of the test are illustrated graphically in FIG. 2. FIG. 2 is a graph of the concentration of selenium in the effluent from the ion exchange bed as a function of the number of bed volumes through which the stripped sour water is passed (1 bed volume=1 ft$^3$ of resin). It can be seen from this graph that the amount of selenium was significantly reduced from a feed concentration of between 244–393 ppb to an average concentration of 26 ppb or less. Furthermore, the ion exchange resin continued to effectively remove selenium for a significantly long period of time (about 1500 bed volumes). At this point, the resin became loaded to the extent that elution would be necessary before the desired level of effluent selenium could be obtained. However, selenium was still being removed, although the selenium concentration was higher than desired.

EXAMPLE 2

This Example was conducted to demonstrate the elution operation of the strong-base anion exchange resin. The loaded resin from Example 1 was eluted with a 50° C. eluant containing 4% NaCl and 0.5% NaOH. The loaded resin was contacted with the eluant at a rate of 0.25 gpm/ft$^3$.

Figure 3:
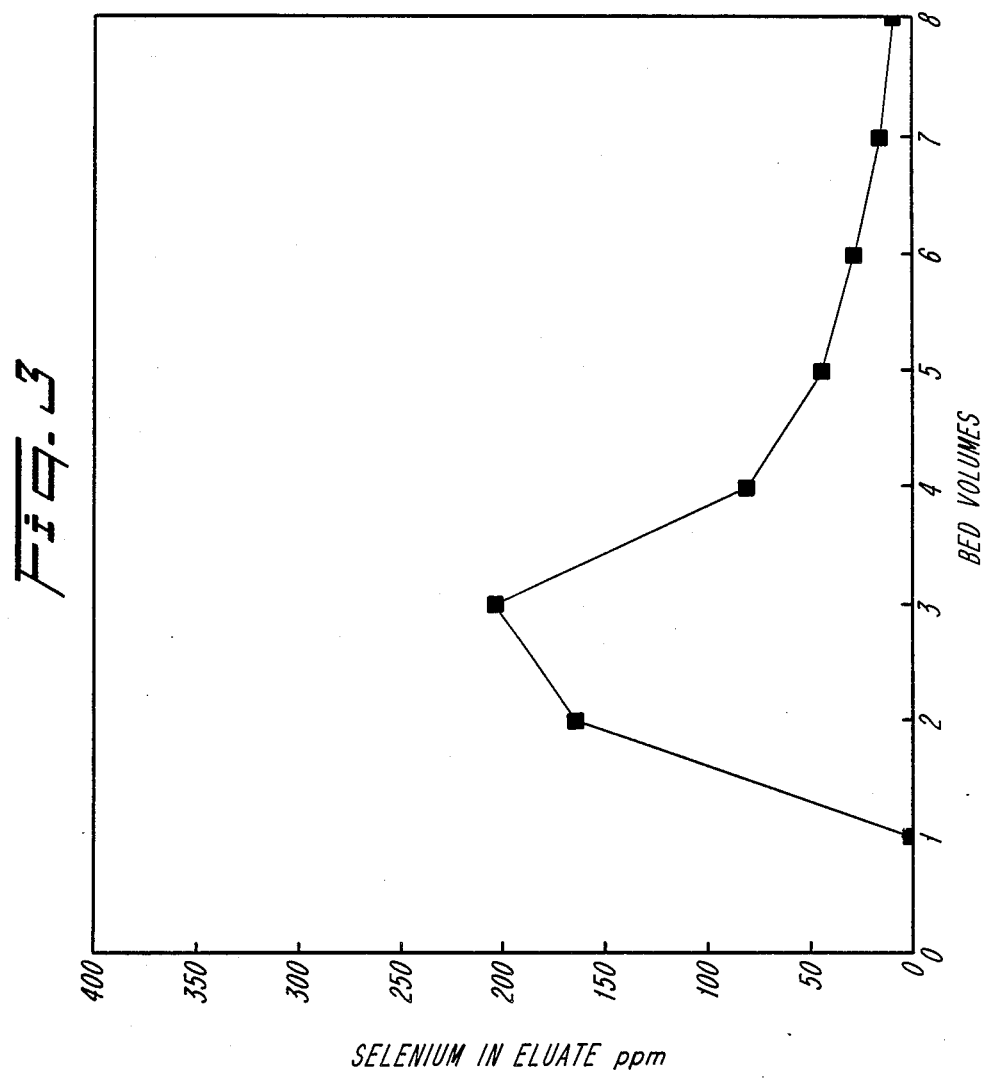
FIG. 3 is a graph illustrating the results of Example 2.

The results of this Example are illustrated graphically in FIG. 3. FIG. 3 shows the selenium concentration in the eluate (in ppm) as a function of bed volume. It can be seen from the graph that selenium was effectively eluted from the resin.

EXAMPLE 3

This Example was conducted to demonstrate the regeneration aspect of the present invention. A Dowex 11 resin which was

TABLE I

| Wt. % Acid | Wt. % NaClO$_3$ | Selenium Conc., ppm, in regenerant | Regenerated Resin, % Se |
|---|---|---|---|
| 0 | 3 | 60 | 7.66 |
| 0 | 6 | 70 | 7.16 |
| 0 | 12 | 70 | 6.99 |
| 3% H$_2$SO$_4$ | 3 | 3060 | 1.16 |
| 3% H$_2$SO$_4$ | 6 | 3260 | 1.09 |
| 3% H$_2$SO$_4$ | 12 | 3320 | .63 |
| 6% H$_2$SO$_4$ | 3 | 3380 | .94 |
| 6% H$_2$SO$_4$ | 6 | 3320 | .68 |
| 6% H$_2$SO$_4$ | 12 | 3480 | .20 |
| 1.1% HCl | 3 | 3030 | 1.31 |
| 1.1% HCl | 6 | 3220 | .96 |
| 1.1% HCl | 12 | 3380 | .33 |

The above data clearly show that effective regeneration of the resin can be obtained with an acidic chlorate solution. The data also show that regeneration without acid is not effective, although regeneration did not appear to be extremely sensitive to acid concentration. Hydrochloric acid appeared to be more effective than sulfuric acid at low concentrations.

To test the effect of regeneration on the resin, the capacity for selenium removal of a regenerated resin was compared with a fresh resin. A fouled resin was regenerated with a 3% NaClO$_3$+1% HCl solution, and reconditioned with a 4% NaCl+0.5% NaOH solution. 100 cc. (net volume) of the regenerated resin and 100 cc. (net volume) fresh resin were both mixed for 3 hours in an 800 cc. solution containing 461 ppm Se. The selenium containing solution was prepared with Na$_2$Se and adjusted to a pH of 8.5 with NaOH. The results are set forth in Table II below. heavily fouled with 7.2% selenium, much of which was in the elemental form, as well as polysulfide and various organics, was regenerated with an acidic chlorate solution. More particularly, fouled resin was pretreated by eluting with a solution containing NaCl and NaOH. In a set of batch tests, 7 cm$^3$ of resin were then contacted for about 5 hours at 50° C. with 70 cc. of regenerant. Several regenerants were tested varying in acid strength and chlorate concentration. The results are set forth below in Table I.

TABLE II

|  | Regenerated Resin | Fresh Resin |
|---|---|---|
| Feed Resin | 2.53% Se | 60 ppm Se |
| Final Resin | 2.80% Se | 1% Se |
| Effluent | 21 ppm Se | 52 ppm Se |
| Se Removed From Solution | 95% | 89% |

From the results above, it can be seen that the regenerated resin left 21 ppm Se (95% removal), whereas the fresh resin left 52 ppm Se (89% removal). Thus, the regenerated resin quite surprisingly performed better than the fresh resin.

EXAMPLE 4

This Example demonstrates selenium recovery from eluates according to the present invention. Several eluates were tested by acidifying to a pH from 2 to 6, with and without oxygenation.

In the test, a loaded Dowex 11 resin was stripped with a 4% NaCl eluant. The resulting eluate had a concentration of 46 ppm Se and pH of 10.7. The eluate was acidified with 0.3 lb/gal HCl. The results are tabulated below.

TABLE III

| Run No. | pH of Eluate | Air Sparge | Other Additive | Filtration | Flotation | Resulting Se Concentration (ppb) | % Removal |
|---|---|---|---|---|---|---|---|
| 1 | 4 | 10 minutes | None | .45 μm | No | 108 | 99.8 |
| 2 | 2 | None | 12 ppm coagulant* | .45 μm | No | 285 | 99.4 |
| 3 | 6 | None | 40 ppm coagulant** | .45 μm | No | 269 | 99.4 |
| 4 | 3 | None | 5 ml crude oil (3 min mix) | None | Yes | 87 | 99.8 |

*Coagulant was Petrolite 9010
**Coagulant was 20 ppm Nalco 3383 + 20 ppm Daxad CP-2

As may be seen from the results above, effective removal of selenium can be obtained using acidification of the eluates (see Runs 2 and 3). Even better results can be obtained with acidification/oxygenation of the eluates (see Runs 1 and 4).

Although the invention has been described with preferred embodiments, it is to be understood that variations and modifications may be used as will be appreciated by those skilled in the art. Such variations are to be considered within the scope of the following claims.

What is claimed is:

1. A process for removing selenium from wastewater effluent comprising the steps of;

(i) contacting a selenide containing wastewater and a strong-base anion exchange resin to adsorb selenide on the resin;

(ii) eluting the ion exchange resin with an eluant which is effective for stripping selenide therefrom; and (iii) recovering elemental selenium from the selenide containing eluate resulting from step (ii).

2. A process according to claim 1 further comprising (iv) regenerating the ion exchange resin by treatment of the resin with an acidic chlorate solution.

3. A process according to claim 1 wherein elemental selenium is recovered from the selenide containing eluate using at least one of (a) acidification of the eluate and (b) oxygenation of the eluate.

4. A process according to claim 3 wherein the eluate is subjected to both acidification and oxygenation to recover elemental selenium therefrom.

5. A process according to claim 4 wherein the eluate is acidified to obtain a pH ranging from about 1 to about 7, and elemental selenium is recovered from a flotation cell or by filtering.

6. A process according to claim 1 wherein the eluant contains at least one of sodium chloride and sodium hydroxide.

7. A process according to claim 1 wherein the eluant contains both sodium chloride and sodium hydroxide.

8. A process according to claim 7 wherein the eluant contains from about 1 to about 10% sodium chloride and from about 0.1 to about 2% sodium hydroxide.

9. A process according to claim 8 wherein the eluant contains from about 3 to about 5% sodium chloride and from about 0.3 to about 0.7% sodium hydroxide.

10. A process according to claim 1 wherein the eluant is heated to a temperature ranging from about 30° to about 50° C.

11. A process according to claim 10 wherein the eluant is heated to a temperature ranging from about 45° to about 50° C.

12. A process according to claim 1 wherein elution is carried out at a rate of about 0.1 to about 0.8 gpm/ft$^3$.

13. A process according to claim 12 wherein elution is carried out at a rate of about 0.2 to about 0.3 gpm/ft$^3$.

14. A process according to claim 2 wherein the acidic chlorate solution contains from about 1 to about 15% sodium chlorate and about 0.5 to about 10% hydrochloric acid.

15. A process according to claim 2 wherein the solution has a temperature ranging from about 35° to about 60° C.

16. A process according to claim 15 wherein the solution has a temperature ranging from about 45° to about 50° C.

17. A process for regenerating a stron-base anion exchange resin used to remove selenium from wastewater effluent comprising treating the resin with an acidic chlorate solution.

18. A process according to claim 17, said strong-base anion exchange resin having been contacted with a selenide containing wastewater to adsorb selenide on the resin, and eluted with an eluant effective for stripping selenide therefrom.

19. A process according to claim 18, wherein the acidic chlorate solution contains from about 1 to about 8% sodium chlorate and about 0.5 to about 5% hydrochloric acid.

20. A process according to claim 18, wherein the solution has a temperature ranging from about 40° to about 55° C.

21. A process according to claim 20, wherein the solution has a temperature ranging from about 45° to about 50° C.

22. A process for removing selenium from petroleum refining wastewater comprising the steps of;

(i) stripping sulfur from selenide containing sour water produced by petroleum refining;

(ii) subjecting the stripped sour water to ion exchange treatment with a strong-base anion exchange resin to adsorb selenide on the resin;

(iii) eluting the ion exchange resin with an eluant for stripping selenide therefrom, said eluant containing at least one of sodium chloride and sodium hydroxide; and (iv) recovering elemental selenium from the selenide containing eluate resulting from step (iii) using at least one of (a) acidification of the eluate and (b) oxygenation of the eluate.

23. A process according to claim 22, further comprising (iv) regenerating the ion exchange resin by treatment of the resin with an acidic chlorate solution.

24. A process according to claim 22, wherein the 2 eluate is subjected to both acidification and oxygenation to recover elemental selenium therefrom.

25. A process according to claim 24, wherein the eluate is acidified to obtain a pH ranging from about 3 to about 5, and elemental selenium is recovered.

26. A process according to claim 22 wherein the eluant contains both sodium chloride and sodium hydroxide.

27. A process according to claim 26, wherein the eluant contains from about 3 to about 5% sodium chloride and from about 0.3 to about 0.7% sodium hydroxide.

28. A process according to claim 22, wherein the eluant is heated to a temperature ranging from about 45° to about 50° C.

29. A process according to claim 22, wherein elution is carried out at a rate of about 0.2 to about 0.3 gpm/ft$^3$.

30. A process according to claim 23, wherein the acidic chlorate solution contains from about 2 to about 4% sodium chlorate and about 0.5 to about 2% hydrochloric acid.

31. A process according to claim 23, wherein the solution has a temperature ranging from about 45° to about 50° C.

32. A process for regenerating a strong-base anion exchange resin used to remove selenide from selenide containing sour water produced by petroleum refining wherein the resin is treated with an acidic chlorate solution.

33. A process according to claim 32, said strong-base anion exchange resin having been contacted with a selenide containing stripped sour water to adsorb selenide on the resin, and eluted with an eluant containing at least one of sodium chloride and sodium hydroxide to strip selenide therefrom.

* * * * *

UNITED STATES PATENT AND TRADEMARK OFFICE
CERTIFICATE OF CORRECTION

PATENT NO. : 4,915,928

DATED : April 10, 1990

INVENTOR(S) : Paul J. Marcantonio

It is certified that error appears in the above-identified patent and that said Letters Patent is hereby corrected as shown below:

Column 4, line 31, delete "protected" and insert -- protenated--.

Column 7, line 29, after "was" insert --heavily fouled with 7.2% selenium, much of which was in the elemental form, as well as polysulfide and various organics, was regenerated with an acidic chlorate solution. More particularly, fouled resin was pretreated by eluting with a solution containing NaCl and NaOH. In a set of batch tests, 7 $cm^3$ of resin were then contacted for about 5 hours at 50°C with 70 cc. of regenerant. Several regenerants were tested varying in acid strength and chlorate concentration. The results are set forth below in Table I.--

UNITED STATES PATENT AND TRADEMARK OFFICE
CERTIFICATE OF CORRECTION

PATENT NO. : 4,915,928
DATED : April 10, 1990
INVENTOR(S) : Paul J. Marcantonio

It is certified that error appears in the above-identified patent and that said Letters Patent is hereby corrected as shown below:

Column 8, line 6 after "below." delete --heavily fouled with 7.2% selenium, much of which was in the elemental form, as well as polysulfide and various organics, was regenerated with an acidic chlorate solution. More particularly, fouled resin was pretreated by eluting with a solution containing NaCl and NaOH. In a set of batch tests, 7 $cm^3$ of resin were then contacted for about 5 hours at 50°C with 70 cc. of regenerant. Several regenerants were tested varying in acid strength and chlorate concentration. The results are set forth below in Table I.--

Column 9, Claim 17, delete "stron-base" and insert --strong-base--.

Column 10, Claim 24, delete the number "2" after "the".

Signed and Sealed this

Seventeenth Day of December, 1991

*Attest:*

HARRY F. MANBECK, JR.

*Attesting Officer*          *Commissioner of Patents and Trademarks*